(12) United States Patent
Yang et al.

(10) Patent No.: US 11,565,832 B2
(45) Date of Patent: Jan. 31, 2023

(54) HARMLESS LOW-CONSUMPTION ON-ORBIT CONTINUOUS LAUNCH SYSTEM

(71) Applicant: NATIONAL UNIVERSITY OF DEFENSE TECHNOLOGY, Changsha (CN)

(72) Inventors: Yueneng Yang, Changsha (CN); Wenjun Hu, Changsha (CN); Chaoyan Zhang, Changsha (CN); Shifeng Zhang, Changsha (CN); Xin Xu, Changsha (CN); Shurui Huang, Changsha (CN); Xiaotong Bu, Changsha (CN); Zhiyang Liu, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 17/826,128

(22) Filed: May 26, 2022

(65) Prior Publication Data

US 2022/0380066 A1    Dec. 1, 2022

(30) Foreign Application Priority Data

May 26, 2021   (CN) .......................... 202110579839.5

(51) Int. Cl.
  *B64G 1/00*   (2006.01)
  *B64G 1/64*   (2006.01)
  *B64G 1/10*   (2006.01)

(52) U.S. Cl.
  CPC ............. *B64G 1/002* (2013.01); *B64G 1/641* (2013.01); *B64G 1/645* (2013.01); *B64G 2001/1092* (2013.01)

(58) Field of Classification Search
  CPC ........ B64G 1/002; B64G 1/641; B64G 1/645; B64G 2001/1092
  See application file for complete search history.

(56) References Cited

U.S. PATENT DOCUMENTS

| 2011/0240802 | A1 | 10/2011 | Balinov |
| 2018/0194494 | A1 | 7/2018 | Dube |
| 2019/0077523 | A1* | 3/2019 | Faber ..................... B64G 1/222 |

FOREIGN PATENT DOCUMENTS

| CN | 104554826 A | 4/2015 |
| CN | 207809821 U | 9/2018 |

(Continued)

*Primary Examiner* — Valentina Xavier
(74) *Attorney, Agent, or Firm* — Bayramoglu Law Offices LLC

(57) ABSTRACT

A harmless low-consumption on-orbit continuous launch system includes a satellite platform, a launch apparatus and a plurality of CubeSats. The satellite platform carries the launch apparatus and dozens or hundreds of CubeSats, and is launched from a ground into an orbit for on-orbit operation. The launch apparatus is configured to store the plurality of CubeSats and provide power for on-orbit launching of each of the CubeSats. A solid working medium in the launch apparatus is activated by heating to undergo a phase change, and the activated solid working medium expands instantly and is converted into a high-pressure gaseous working medium. The high-pressure gaseous working medium does work to eject the CubeSats, such that the CubeSats obtain a speed increment. The CubeSats enter a transfer orbit towards different target spacecraft through the speed increment applied by the launch apparatus to perform a plurality of different on-orbit serving missions.

13 Claims, 1 Drawing Sheet

(56) References Cited

FOREIGN PATENT DOCUMENTS

| CN | 109654948 A | 4/2019 |
|---|---|---|
| CN | 110127087 A | 8/2019 |
| CN | 210644922 U | 6/2020 |
| CN | 112319863 A | 2/2021 |

* cited by examiner

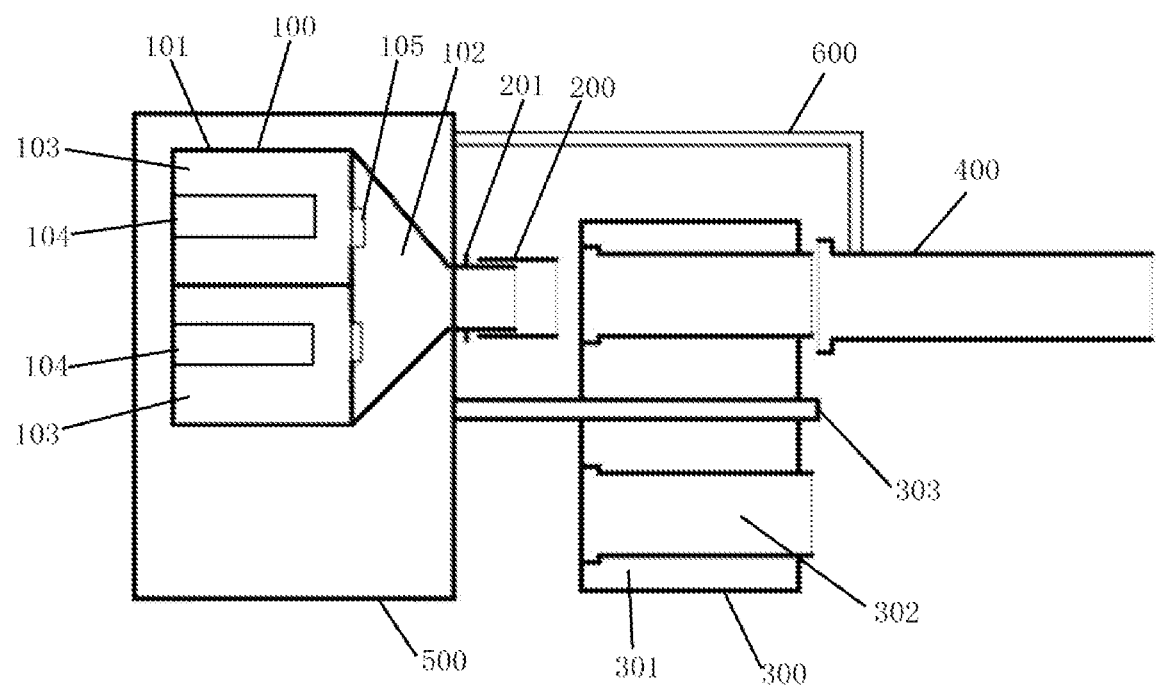

HARMLESS LOW-CONSUMPTION ON-ORBIT CONTINUOUS LAUNCH SYSTEM

CROSS REFERENCE TO THE RELATED APPLICATIONS

This application is based upon and claims priority to Chinese Patent Application No. 202110579839.5, filed on May 26, 2021, the entire contents of which are incorporated herein by reference.

TECHNICAL FIELD

The present disclosure relates to the technical field of the overall design of spacecraft, in particular to a harmless low-consumption on-orbit continuous launch system.

BACKGROUND

With the continuous development of space technology and aerospace industry, the demand for on-orbit serving missions such as on-orbit refueling, on-orbit maintenance and debris removal is growing, which brings new challenges to space launch.

The "single rocket, single satellite" mode of completing a single space mission with a single launch has high fuel consumption and high cost, and it is hard to continuously complete multiple missions in a relatively short period of time.

The "single rocket, multiple satellites" mode and the on-orbit launch mode (referring to the release of mission satellites into orbit on on-orbit platforms such as space stations, cargo spacecraft and satellites) can save fuel consumption and costs. However, the mission satellites need to rely on propulsion systems (consuming propellant, etc.) for orbital transfer to complete the intended space mission.

The "sing rocket, single satellite", "single rocket, multiple satellites" and on-orbit launch modes all have problems such as high fuel consumption, high cost and harmful emissions. Therefore, it is highly desirable to develop an on-orbit launch technology with low fuel consumption, low cost, high efficiency and harmless emissions.

SUMMARY

In order to solve the defects existing in the prior art, the present disclosure provides a harmless low-consumption on-orbit continuous launch system.

To achieve the above objective, the present disclosure adopts the following technical solution:

A harmless low-consumption on-orbit continuous launch system includes a satellite platform, a launch apparatus and a plurality of CubeSats, where the satellite platform is configured to carry the launch apparatus and the plurality of CubeSats, and is launched from a ground into an orbit for on-orbit operation;

the launch apparatus is configured to store the plurality of CubeSats and provide power for on-orbit launching of each of the CubeSats, where a solid working medium in the launch apparatus is activated by heating to undergo a phase change; the activated solid working medium expands instantly and is converted into a high-pressure gaseous working medium; and the high-pressure gaseous working medium does work to eject the CubeSats, such that the CubeSats obtain a speed increment; and the CubeSats enter a transfer orbit towards different target spacecraft through the speed increment applied by the launch apparatus to perform on-orbit serving missions.

Preferably, the solid working medium may be solid carbon dioxide. The solid working medium in the launch apparatus is activated by heating to undergo a phase change. The activated solid carbon dioxide expands instantly and is converted into high-pressure gaseous carbon dioxide. The high-pressure gaseous carbon dioxide does work to eject the CubeSats, such that the CubeSats obtain a speed increment to enter a transfer orbit towards a target spacecraft to perform various on-orbit serving missions such as on-orbit maintenance and on-orbit assembly. The present disclosure effectively solves the problems of high fuel consumption, high cost and harmful emissions of existing launch methods, and provides a harmless, safe, reliable and low-cost on-orbit launch method, offering a feasible solution for energy conservation and emission reduction in the aerospace field.

In a preferable solution of the present disclosure, the launch apparatus may include a working medium storage device, a telescopic tube, a rotary CubeSat bin, a launch rail and a launch controller; the working medium storage device may include a working medium storage tank and an acceleration compartment; the working medium storage tank may be internally provided with a plurality of independent working medium storage compartments, and the solid working medium may be stored in each of the working medium storage compartments; each of the working medium storage compartments may be internally provided with an electrical activation device for activating the solid working medium in each of the working medium storage compartments to undergo a phase change; an outlet of each of the working medium storage compartments may be provided with a one-way valve, and each of the working medium storage compartments may be communicated with the acceleration compartment through the one-way valve; an outlet of the acceleration compartment may be connected to an inlet end of the telescopic tube; the rotary CubeSat bin may include a CubeSat storage box and a rotation motor; the CubeSat storage box may be internally provided with a plurality of independent CubeSat storage compartments; one CubeSat may be stored in each of the CubeSat storage compartments; each of the CubeSat storage compartments may be internally provided with an electromagnet, and the electromagnet may be turned on to lock the CubeSat and turned off to unlock the CubeSat; the rotation motor may be configured to rotate the CubeSat storage box, such that an inlet of each of the CubeSat storage compartments may be butted with an outlet of the telescopic tube, and an outlet of each of the CubeSat storage compartments may be butted with an inlet of the launch rail; the launch rail may be configured to increase a range for launching the CubeSats; the launch controller may include a rotation motor controller and an ignition controller; and the rotation motor controller may be configured to control rotation of the rotary CubeSat bin, and the ignition controller may be configured to control activation of the electrical activation device in each of the working medium storage compartments.

In a preferable solution of the present disclosure, a buffer isolation layer may be wrapped on an outer wall of the working medium storage tank, and may be configured to maintain a working medium storage temperature and reduce a reaction force generated during a launch.

In a preferable solution of the present disclosure, each of the working medium storage compartments may be internally provided with a temperature sensor for real-time monitoring of a working medium temperature; and the working medium storage tank may be internally provided with a pressure sensor for real-time monitoring of an internal pressure of the working medium storage tank.

Further, each of the CubeSats may include an attitude control system, an integrated electronic system, a communications system, a propulsion system and a payload; and the CubeSats may enter the transfer orbit towards different targets through the speed increment applied by the launch apparatus to perform on-orbit serving missions such as on-orbit refueling, on-orbit maintenance and space debris removal.

Further, the satellite platform may include an energy subsystem, a structural subsystem, an orbit control subsystem, an attitude control subsystem and a temperature control system; and the energy subsystem of the satellite platform may include a solar array and a storage battery.

A launch method of the above harmless low-consumption on-orbit continuous launch system includes the following steps:

(1) launching the satellite platform carrying the launch apparatus and the plurality of CubeSats from a ground into an intended orbit;

(2) deploying and operating the solar array of the satellite platform to provide electrical energy for each instrument and equipment of the satellite platform, the electrical activation device for realizing the phase change activation of the solid working medium, and the rotation motor for realizing the rotation of the rotary CubeSat bin;

(3) adjusting an attitude of the satellite platform according to a current orbital position of a target spacecraft;

(4) turning off the electromagnet in the CubeSat storage compartment to unlock the CubeSat;

(5) controlling, by the rotation motor controller, the rotation motor to rotate the rotary CubeSat bin, such that the inlet of the CubeSat storage compartment with the CubeSat unlocked is butted with the outlet of the telescopic tube, and the outlet of the CubeSat storage compartment with the CubeSat unlocked is butted with the inlet of the launch rail;

(6) controlling the electrical activation device in the working medium storage compartment to ignite to activate the phase change of the solid carbon dioxide, such that the solid carbon dioxide expands instantly and is converted into the high-pressure gaseous carbon dioxide;

(7) allowing the high-pressure gaseous carbon dioxide to pass through the one-way valve and then be accelerated and ejected by the acceleration compartment to eject the CubeSat by the telescopic tube, such that the CubeSat enters the transfer orbit towards different target spacecraft at a certain speed through the launch rail to perform an on-orbit serving mission; and (8) returning to step (3) to continue to launch a next CubeSat until a current number of target spacecraft is zero or a current number of CubeSats to be launched is zero.

The present disclosure achieves an environmentally friendly, safe and efficient on-orbit launch method, which can greatly reduce fuel consumption and emission of harmful substances, and greatly promote energy conservation and emission reduction in space activities. The on-orbit continuous launch method will change the mission mode of existing on-orbit services, which is of great significance to the maintenance of national space facilities and space security. Compared with the prior art, the present disclosure has the following advantages:

(1) The launch method through the phase change of the carbon dioxide is a non-combustion (i.e., decomposition) physical launch technology with high energy utilization.

(2) The launch method through the phase change of the carbon dioxide emits carbon dioxide, which is non-toxic and harmless, and it does not produce new carbon dioxide.

(3) The carbon dioxide is abundant, convenient to obtain, and low-cost.

(4) The carbon dioxide is safe, non-flammable, non-explosive, and easy to store, transport and use.

(5) The mission CubeSat does not need to be provided with a power device or a working medium for orbital transfer of an on-orbit secondary launch, which achieves miniaturization and light weight, and lowers the manufacturing cost.

(6) The launch method through the phase change of the carbon dioxide can continuously and accurately launch a plurality of CubeSats, greatly reducing the launch cost and improving the on-orbit serving capability.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show merely some embodiments of the present disclosure, and those of ordinary skill in the art may still derive other drawings from these drawings without creative efforts.

FIGURE is a structural diagram of a launch apparatus according to an embodiment of the present disclosure.

REFERENCE NUMERALS 100. working medium storage device; 101. working medium storage tank; 102. acceleration compartment; 103. working medium storage compartment; 104. electrical activation device; 105. one-way valve; 200. telescopic tube; 201. limit ring; 300. rotary CubeSat bin; 301. CubeSat storage box; 302. CubeSat storage compartment; 303. rotating shaft; 400. launch rail; 500. base; and 600. support frame.

The objectives, functional features and advantages of the present disclosure will be further described with reference to the drawings and the embodiments.

DETAILED DESCRIPTION OF THE EMBODIMENTS

In order to make the objectives, technical solutions and advantages of the embodiments of the present disclosure more clear, the spirit disclosed by the present disclosure will be clearly described below with reference to the drawings and specific embodiments. Those skilled in the art may make changes and modifications to the embodiments of the present disclosure without departing from the spirit and scope of the present disclosure. The exemplary embodiments and description of the present disclosure are intended to explain the present disclosure, rather than to limit the present disclosure.

Referring to FIGURE, an embodiment of the present disclosure provides a launch apparatus, which is configured to store a plurality of CubeSats and provide power for on-orbit launching of each of the CubeSats. A solid working medium in the launch apparatus is activated by heating to undergo a phase change. The activated solid working medium expands instantly and is converted into a high-pressure gaseous working medium. The high-pressure gaseous working medium does work to eject the CubeSats, such that the CubeSats obtain a speed increment. The solid working medium is solid carbon dioxide.

The launch apparatus includes a working medium storage device 100, a telescopic tube 200, a rotary CubeSat bin 300, a launch rail 400 and a launch controller. The telescopic tube 200 is configured to connect the working medium storage device to the rotary CubeSat bin.

The working medium storage device 100 includes a working medium storage tank 101 and an acceleration compartment 102. The working medium storage tank 101 is internally provided with a plurality of independent working medium storage compartments 103, and the solid working medium is stored in each of the working medium storage compartments 103. Each of the working medium storage compartments 103 is internally provided with an electrical activation device 104 for activating the solid working medium in each of the working medium storage compartments 103 to undergo a phase change. An outlet of each of the working medium storage compartments 103 is provided with a one-way valve 105, and each of the working medium storage compartments is communicated with the acceleration compartment 102 through the one-way valve 105. An outlet of the acceleration compartment 102 is connected to an inlet end of the telescopic tube 200. The one-way valve 105 is composed of a valve outlet, a copper sheet and a gland, and is configured to control a pressure of the gaseous carbon dioxide after the phase change of the solid carbon dioxide. The telescopic tube 200 includes a fixed section and a telescopic section. The fixed section is defined by a fixed tube portion, and the telescopic section is defined by a telescopic tube portion. The fixed section is a front section at one end of the telescopic tube 200 close to the working medium storage device 100. A limit ring 201 is provided on an outer side of the front section of the telescopic tube 200 close to the working medium storage device 100. The limit ring 201 isolates the working medium storage device 100 from the telescopic section of the telescopic tube 200 to prevent the telescopic tube 200 from directly acting on the working medium storage device 100 when the telescopic tube 200 is stretched.

The rotary CubeSat bin 300 includes a CubeSat storage box 301 and a rotation motor (not shown in the FIGURE). The CubeSat storage box 301 is internally provided with a plurality of independent CubeSat storage compartments 302. One CubeSat is stored in each of the CubeSat storage compartments 302. Each of the CubeSat storage compartments 302 is internally provided with an electromagnet, and the electromagnet is turned on to lock the CubeSat and turned off to unlock the CubeSat. In this embodiment, a rotating shaft 303 is provided in a center of the CubeSat storage box 301. A plurality of CubeSat storage compartments 302 are arranged around the rotating shaft 303. The rotating shaft 303 is connected to the rotation motor, and is driven to rotate by the rotation motor.

The CubeSat storage compartments 302 are configured to store the CubeSats. Each of the CubeSat storage compartments 302 is divided into a front section and a rear section. The front section can be butted with the telescopic tube 200 and connected to the working medium storage device 100 through the telescopic tube 200. The rear section is configured to store the CubeSat. Each of the CubeSat storage compartments 302 forms a closed airway when the CubeSat is launched.

The rotation motor is configured to rotate the CubeSat storage box 301. The rotation motor is connected to the rotating shaft 303 in the center of the CubeSat storage box 301, and provides rotational torque for the CubeSat storage box. The rotation motor is configured to rotate the CubeSat storage box 301, such that an inlet of each of the CubeSat storage compartments 302 is butted with an outlet of the telescopic tube 200, and an outlet of each of the CubeSat storage compartments 302 is butted with an inlet of the launch rail 400. The launch rail 400 is configured to increase a range for launching the CubeSats.

The launch controller includes a rotation motor controller and an ignition controller. The rotation motor controller is configured to control rotation of the rotary CubeSat bin, and the ignition controller is configured to control activation of the electrical activation device in each of the working medium storage compartments. The electrical activation device 104 is a heating wire. The ignition controller energizes the heating wire to activate the phase change of the solid carbon dioxide in each of the working medium storage compartments. The solid carbon dioxide expands instantly and is converted into the high-pressure gaseous carbon dioxide.

A buffer isolation layer is wrapped on an outer wall of the working medium storage tank 101, and is configured to maintain a working medium storage temperature and reduce a reaction force generated during a launch. Each of the working medium storage compartments 103 is internally provided with a temperature sensor for real-time monitoring of a working medium temperature. The acceleration compartment 102 of the working medium storage tank 101 is internally provided with a pressure sensor for real-time monitoring of an internal pressure of the working medium storage tank.

In this embodiment, the launch apparatus further includes a support mechanism, which includes a base 500 for installing and supporting the working medium storage device 100 and a support frame 600 for supporting the telescopic tube 200 and the launch rail 400. FIGURE is merely a schematic diagram of the launch apparatus. In practical applications, different support mechanisms may be designed according to specific structures for the support and installation of the working medium storage device 100, the telescopic tube 200, the rotary CubeSat bin 300, the launch rail 400 and the launch controller.

An embodiment of the present disclosure provides a harmless low-consumption on-orbit continuous launch system, including a satellite platform, a launch apparatus and a plurality of CubeSats.

The satellite platform is configured to carry the launch apparatus and the plurality of CubeSats, and is launched from a ground into an orbit for on-orbit operation.

The launch apparatus is shown in FIGURE. The launch apparatus is configured to store a plurality of CubeSats and provide power for on-orbit launching of each of the CubeSats. Solid carbon dioxide in the launch apparatus is activated by heating to undergo a phase change. The activated solid carbon dioxide expands instantly and is converted into high-pressure gaseous carbon dioxide. The high-pressure gaseous carbon dioxide does work to eject the CubeSats, such that the CubeSats obtain a speed increment.

The CubeSats enter a transfer orbit towards different target spacecraft through the speed increment applied by the launch apparatus to perform an on-orbit serving mission.

The satellite platform mainly includes an energy subsystem, a structural subsystem, an orbit control subsystem, an attitude control subsystem and a temperature control system. The satellite platform carries the launch apparatus and the plurality of CubeSats, and is launched from the ground into the orbit for on-orbit operation. The energy subsystem of the satellite platform includes a solar array and a storage battery.

The structure of the launch apparatus is described in detail above, and will not be repeated herein.

Each of the CubeSats has a volume of 10 U and a weight of 10 kg, and mainly includes an attitude control system, an integrated electronic system, a communications system, a propulsion system and a payload. The CubeSats enter the transfer orbit towards different targets through the speed increment applied by the launch apparatus to perform on-orbit serving missions such as on-orbit refueling, on-orbit maintenance and space debris removal.

Taking the removal of low-orbit space debris as an example, an on-orbit continuous launch method of the above harmless low-consumption on-orbit continuous launch system includes the following steps:

(1) The satellite platform carrying the launch apparatus and a plurality of CubeSats is launched from the ground into an intended orbit, such as an orbit at an altitude of 600 km.

(2) The solar array of the satellite platform is deployed and operated to provide electrical energy for each instrument and equipment of the satellite platform, the electrical activation device for realizing the phase change activation of the solid working medium, and the rotation motor for realizing the rotation of the rotary CubeSat bin.

(3) The satellite platform adjusts an attitude thereof according to a current orbital position of a target spacecraft.

(4) The electromagnet in the CubeSat storage compartment is turned off to unlock the CubeSat.

(5) The rotation motor controller controls the rotation motor to rotate the rotary CubeSat bin, such that the inlet of the CubeSat storage compartment with the CubeSat unlocked is butted with the outlet of the telescopic tube, and the outlet of the CubeSat storage compartment with the CubeSat unlocked is butted with the inlet of the launch rail.

(6) The ignition controller energizes the electric heating wire in the working medium storage compartment to activate the phase change of the solid carbon dioxide in the working medium storage compartment, such that the solid carbon dioxide expands instantly and is converted into the high-pressure gaseous carbon dioxide.

(7) The high-pressure gaseous carbon dioxide passes through the one-way valve and is accelerated and ejected by the acceleration compartment to launch the CubeSat by the telescopic tube, such that the CubeSat enters the transfer orbit towards different target space debris at a certain speed through the launch rail to perform the mission of removing space debris in low orbit.

(8) The operation returns to Step (3) to continue to launch a next CubeSat until a current number of target spacecraft is zero or a current number of CubeSats to be launched is zero.

The above embodiments are merely intended to describe several implementations of the present disclosure, and the description thereof is more specific and detailed, but is not to be construed as a limitation on the patentable scope of the present disclosure. It should be noted that those of ordinary skill in the art can further make variations and improvements without departing from the concept of the present disclosure. These variations and improvements all fall within the protection scope of the present disclosure. Therefore, the protection scope of the present disclosure should be subject to the protection scope defined by the claims.

What is claimed is:

1. A harmless low-consumption on-orbit continuous launch system, comprising a satellite platform, a launch apparatus and a plurality of CubeSats, wherein the satellite platform is configured to carry the launch apparatus and the plurality of CubeSats, and the satellite platform is launched from a ground into an orbit for on-orbit operation;

the launch apparatus is configured to store the plurality of CubeSats and provide power for on-orbit launching of each of the CubeSats, wherein a solid working medium in the launch apparatus is activated by heating to undergo a phase change; the activated solid working medium expands instantly and is converted into a high-pressure gaseous working medium; and the high-pressure gaseous working medium does work to eject the CubeSats, such that the CubeSats obtain a speed increment; the launch apparatus comprises a working medium storage device, a telescopic tube, a rotary CubeSat bin, a launch rail and a launch controller; the working medium storage device comprises a working medium storage tank and an acceleration compartment; the working medium storage tank is internally provided with a plurality of independent working medium storage compartments, and the solid working medium is stored in each of the working medium storage compartments; each of the working medium storage compartments is internally provided with an electrical activation device for activating the solid working medium in each of the working medium storage compartments to undergo a phase change; an outlet of each of the working medium storage compartments is provided with a one-way valve, and each of the working medium storage compartments is communicated with the acceleration compartment through the one-way valve; an outlet of the acceleration compartment is connected to an inlet end of the telescopic tube; the rotary CubeSat bin comprises a CubeSat storage box and a rotation motor; the CubeSat storage box is internally provided with a plurality of independent CubeSat storage compartments; one CubeSat is stored in each of the CubeSat storage compartments; each of the CubeSat storage compartments is internally provided with an electromagnet, and the electromagnet is turned on to lock the CubeSat and turned off to unlock the CubeSat; the rotation motor is configured to rotate the CubeSat storage box, such that an inlet of each of the CubeSat storage compartments is butted with an outlet of the telescopic tube, and an outlet of each of the CubeSat storage compartments is butted with an inlet of the launch rail; the launch rail is configured to increase a range for launching the CubeSats; the launch controller comprises a rotation motor controller and an ignition controller, wherein the rotation motor controller is configured to control rotation of the rotary CubeSat bin, and the ignition controller is configured to control activation of the electrical activation device in each of the working medium storage compartments; and the CubeSats enter a transfer orbit towards different target spacecraft through the speed increment applied by the launch apparatus to perform a plurality of different on-orbit serving missions.

2. The harmless low-consumption on-orbit continuous launch system according to claim 1, wherein the solid working medium is solid carbon dioxide.

3. The harmless low-consumption on-orbit continuous launch system according to claim 1, wherein a buffer isolation layer is wrapped on an outer wall of the working medium storage tank, and the buffer isolation layer is configured to maintain a working medium storage temperature and reduce a reaction force generated during a launch.

4. The harmless low-consumption on-orbit continuous launch system according to claim 1, wherein each of the working medium storage compartments is internally provided with a temperature sensor for real-time monitoring of a working medium temperature; and the working medium storage tank is internally provided with a pressure sensor for real-time monitoring of an internal pressure of the working medium storage tank.

5. The harmless low-consumption on-orbit continuous launch system according to claim 4, wherein each of the CubeSats comprises an attitude control system, an integrated electronic system, a communications system, a propulsion system and a payload.

6. The harmless low-consumption on-orbit continuous launch system according to claim 1, wherein the satellite platform comprises an energy subsystem, a structural subsystem, an orbit control subsystem, an attitude control subsystem and a temperature control system; and the energy subsystem of the satellite platform comprises a solar array and a storage battery.

7. A launch apparatus, wherein the launch apparatus is configured to store a plurality of CubeSats and provide power for on-orbit launching of each of the CubeSats, a solid working medium in the launch apparatus is activated by heating to undergo a phase change; the activated solid working medium expands instantly and is converted into a high-pressure gaseous working medium; the high-pressure gaseous working medium does work to eject the CubeSats, such that the CubeSats obtain a speed increment; the solid working medium is solid carbon dioxide; the launch apparatus comprises a working medium storage device, a telescopic tube, a rotary CubeSat bin, a launch rail and a launch controller; the working medium storage device comprises a working medium storage tank and an acceleration compartment; the working medium storage tank is internally provided with a plurality of independent working medium storage compartments, and the solid working medium is stored in each of the working medium storage compartments; each of the working medium storage compartments is internally provided with an electrical activation device for activating the solid working medium in each of the working medium storage compartments to undergo a phase change; an outlet of each of the working medium storage compartments is provided with a one-way valve, and each of the working medium storage compartments is communicated with the acceleration compartment through the one-way valve; an outlet of the acceleration compartment is connected to an inlet end of the telescopic tube; the rotary CubeSat bin comprises a CubeSat storage box and a rotation motor; the CubeSat storage box is internally provided with a plurality of independent CubeSat storage compartments; one CubeSat is stored in each of the CubeSat storage compartments; each of the CubeSat storage compartments is internally provided with an electromagnet, and the electromagnet is turned on to lock the CubeSat and turned off to unlock the CubeSat; the rotation motor is configured to rotate the CubeSat storage box, such that an inlet of each of the CubeSat storage compartments is butted with an outlet of the telescopic tube, and an outlet of each of the CubeSat storage compartments is butted with an inlet of the launch rail; the launch rail is configured to increase a range for launching the CubeSats; the launch controller comprises a rotation motor controller and an ignition controller, wherein the rotation motor controller is configured to control rotation of the rotary CubeSat bin, and the ignition controller is configured to control activation of the electrical activation device in each of the working medium storage compartments.

8. The launch apparatus according to claim 7, wherein a buffer isolation layer is wrapped on an outer wall of the working medium storage tank, and the buffer isolation layer is configured to maintain a working medium storage temperature and reduce a reaction force generated during a launch; each of the working medium storage compartments is internally provided with a temperature sensor for real-time monitoring of a working medium temperature; and the working medium storage tank is internally provided with a pressure sensor for real-time monitoring of an internal pressure of the working medium storage tank.

9. The harmless low-consumption on-orbit continuous launch system according to claim 2, wherein each of the working medium storage compartments is internally provided with a temperature sensor for real-time monitoring of a working medium temperature; and the working medium storage tank is internally provided with a pressure sensor for real-time monitoring of an internal pressure of the working medium storage tank.

10. The harmless low-consumption on-orbit continuous launch system according to claim 3, wherein each of the working medium storage compartments is internally provided with a temperature sensor for real-time monitoring of a working medium temperature; and the working medium storage tank is internally provided with a pressure sensor for real-time monitoring of an internal pressure of the working medium storage tank.

11. The harmless low-consumption on-orbit continuous launch system according to claim 2, wherein the satellite platform comprises an energy subsystem, a structural subsystem, an orbit control subsystem, an attitude control subsystem and a temperature control system; and the energy subsystem of the satellite platform comprises a solar array and a storage battery.

12. The harmless low-consumption on-orbit continuous launch system according to claim 3, wherein the satellite platform comprises an energy subsystem, a structural subsystem, an orbit control subsystem, an attitude control subsystem and a temperature control system; and the energy subsystem of the satellite platform comprises a solar array and a storage battery.

13. The harmless low-consumption on-orbit continuous launch system according to claim 5, wherein the satellite platform comprises an energy subsystem, a structural subsystem, an orbit control subsystem, an attitude control subsystem and a temperature control system; and the energy subsystem of the satellite platform comprises a solar array and a storage battery.

* * * * *